United States Patent
Neklyudov et al.

(10) Patent No.: US 7,654,439 B2
(45) Date of Patent: Feb. 2, 2010

(54) METHOD OF SOLID PHASE WELDING OF METAL PLATES

(75) Inventors: Ivan Matveevich Neklyudov, Kharkov (UA); Borys Viktorovich Borts, Kharkov (UA); Igor Eduardovich Vasyekha, Kharkov (UA); Oleksandr Trohimovich Lopata, Kharkov (UA)

(73) Assignees: European Consulting Group, LLC, Philadelphia, PA (US); Collective Enterprise "ADVICE SIR-78 NSC KIPT (National Science Center Kharkov Institute of Physics and Technology)", Kharkov (UA)

( * ) Notice: Subject to any disclaimer, the term of this patent is extended or adjusted under 35 U.S.C. 154(b) by 37 days.

(21) Appl. No.: 12/097,155

(22) PCT Filed: Dec. 12, 2006

(86) PCT No.: PCT/US2006/061915

§ 371 (c)(1),
(2), (4) Date: Jun. 12, 2008

(87) PCT Pub. No.: WO2007/070787

PCT Pub. Date: Jun. 21, 2007

(65) Prior Publication Data

US 2008/0290143 A1  Nov. 27, 2008

(30) Foreign Application Priority Data

Dec. 12, 2005  (UA)  ................. 200511847

(51) Int. Cl.
B23K 31/02  (2006.01)

(52) U.S. Cl. ...................... 228/265; 228/229

(58) Field of Classification Search ............. 228/115, 228/117, 265, 227, 228, 229, 235.2, 17, 30
See application file for complete search history.

(56) References Cited

U.S. PATENT DOCUMENTS

2005/0230371 A1  10/2005  Kutsuna et al.

FOREIGN PATENT DOCUMENTS

JP  63056423  3/1988

(Continued)

OTHER PUBLICATIONS

Chang et al., "Application of Roll Welding to Brazing", Weld J 82 No. 10 (Oct. 2003), pp. 28-31.

(Continued)

*Primary Examiner*—Roy King
*Assistant Examiner*—Steven Ha
(74) *Attorney, Agent, or Firm*—Caesar, Rivise, Bernstein, Cohen & Pokotilow, Ltd.

(57) ABSTRACT

In a method of welding of metal plates in a solid phase, wherein the metal plates are combined to form a package, and welded together by heating and deforming the package by contacting with two rotating cylinders, the improvement includes: providing a damping lining between the metal plates; placing the package between two cylinders such that the metal plate with the smallest yield value under welding temperature faces the cylinder with smaller diameter, heating and deforming the package in vacuum, such that during a first stage the temperature reaches 0.4-0.5 of melting temperature of a metal plate with the smallest yield value, during a second stage the package is heated by a high frequency which heats the damping lining up to 0.92-0.95 of its melting temperature, wherein angular velocities of the rotating cylinders and their radiuses are selected in accordance with a formula.

8 Claims, 2 Drawing Sheets

FOREIGN PATENT DOCUMENTS

| | | |
|---|---|---|
| JP | 04091872 | 3/1992 |
| JP | 2005081355 | 3/2005 |
| RU | 2082575 C1 | 6/1997 |
| SU | 406691 | 8/1974 |
| SU | 565801 | 7/1977 |

OTHER PUBLICATIONS

ISR for PCT/US06/61915.

European Search Report for EP 06 84 8443.

METHOD OF SOLID PHASE WELDING OF METAL PLATES

This application claims the benefit of Ukrainian Patent Application No. 2005 11847 filed Dec. 12, 2005.

BACKGROUND OF THE INVENTION

1. Field of Invention

This invention relates to a method of welding of metal plates conducted in a solid phase. This invention can be applied in the area of composite multilayer metal products manufacturing by solid-phase welding under pressure and can be introduced to various sectors of industry, such as: metallurgy, automotive, instrument making and other industries.

2. Description of Related Art

In the process of moldability treatment under pressure, various layers in sandwiched products are composed of different metals and deformed unevenly, this happens because while different metals are reaching moldability state they rest on different deformation points. Due to uneven layer deformation, significant residual stresses are produced in layers, products are subject to corrugation and adherence of the layers is significantly reduced.

A known solid-phase welding method describes sandwiching metal plates together with additional metal lining inserted between plates to create a package, heating this package in vacuum, placing it between special cylinders and deformation of the package in vacuum (USSR patent No. 565801, B23P 3/06, 1977) [1]. The package is placed between cylinders of same diameter. To improve isotropic properties of finished products, before metal plates are sandwiched together in a package, their contacting surfaces shall be riffled by applying evenly distributed longitudinal channels.

In the course of concurrent deformation of superimposed plates, it is mandatory to achieve the most even distribution of deformation force on the surfaces of plates in all layers to achieve their best possible adhesion. This provides renewal of the bonded surfaces and intensifies adhesion processes improving bonding strength between the layers. Deformation level on surfaces bonded with the purpose to acquire flat bimetallic materials (caeteris paribus—other conditions being equal (lat.)) shall be determined on the basis of distributing vertical volumetric movements, conditioned, along with other conditions, by movements of deforming instrument.

When bonded plates are deformed by cylinders rotated with similar velocities, as it is done according to method [1], placement of plates in the package in relation to cylinders has no influence on the intensity of interlayer deformations that is cohesion strength between layers in this case is low.

A known method of production of flat bimetallic materials (RU patent No. 2082575, B23K 20/04, 1997) [2] can be used as a prototype for the method of the invention. This method consists of following stages: metal plates are superimposed to form a sandwich, which is placed between two rotating cylinders of different diameter, heated and deformed by the cylinders. In the process of deformation, the plate with smallest thickness shall be placed in contact with the cylinder having higher rotation velocity.

Despite the current developments, an improvement in the process of welding of metal plates is desired.

All references cited herein are incorporated herein by reference in their entireties.

BRIEF SUMMARY OF THE INVENTION

The method consists of following stages: metal plates are sandwiched together to form a composite package or a sandwich, heated, and then the composite package is placed between two cylinders of different diameter and deformed. A special damping lining is inserted between the plates, the package is placed between cylinders in such a way, that the plate with the smallest yield value under welding temperature shall face cylinder with smaller diameter. Heating and deformation of the sandwich shall be carried out in the vacuum. Heating is carried out in two stages, at first temperature reaches 0.4-0.5 of melting temperature of a plate with the smallest yield value, then—HF (high frequency) heating is applied, where the high frequency shall heat the damping lining up to 0.92-0.95 of its melting temperature. Angular velocities of the rotating cylinders and their radiuses shall be chosen on the basis of following conditions: $\sigma_{s1}(T) \times \epsilon_1 \times H_1 / \sigma_{s2}(T) \times \epsilon_2 \times H_2 = \omega_2 \times R_2 / \omega_1 \times R_1$ (1), where $\sigma_{s1}(T)$ and $\sigma_{s2}(T)$—yield value of each plate under welding temperature; $\epsilon_1$ and $\epsilon_2$—relative pressure on each plate; $H_1$ and $H_2$—initial thickness of each plate; $\omega_1$ and $\omega_2$—angular velocity of each cylinder; $R_1$, and $R_2$—radius of each cylinder. This method allows production of sandwiches (packages) with strong plate bonding and excellent linearity of welded product. To achieve better results metal plate facing smaller diameter cylinder shall be the thickest one. Copper was selected as a preferred material for damping lining.

In certain embodiments, an additional metal liner is inserted between the damping lining and the plate with the smallest yield value. The metal liner can be made of following materials: niobium, tantalum and nickel.

DETAILED DESCRIPTION OF PREFERRED EMBODIMENTS OF THE INVENTION

Figure 1:
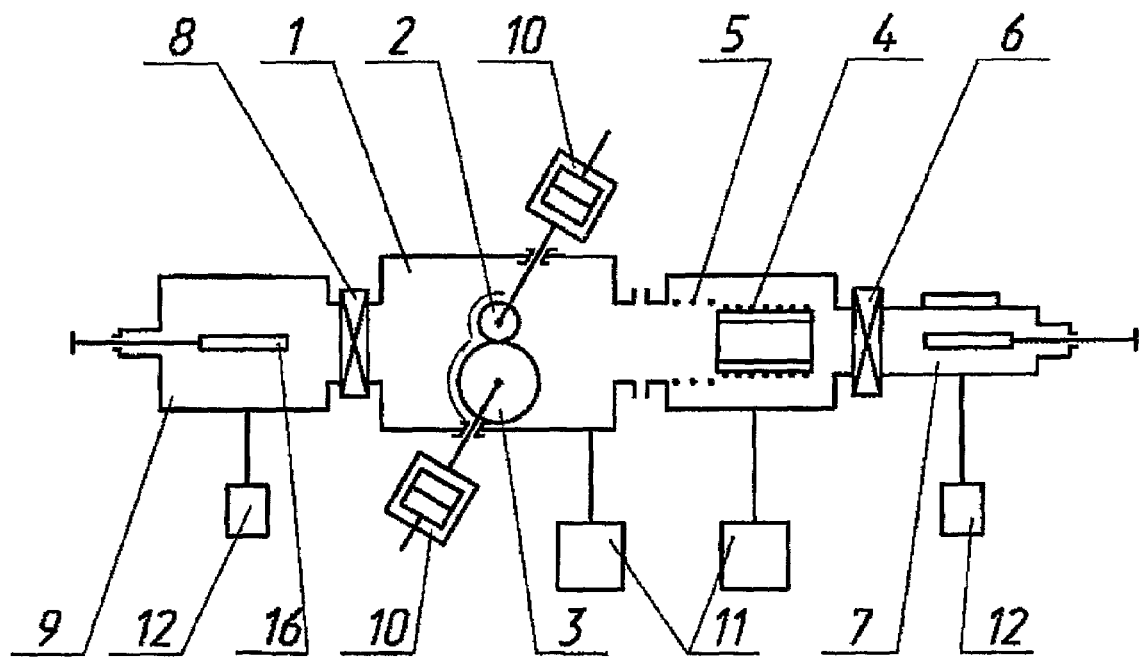
FIG. 1 shows a device developed for the welding method of the invention.

When the plates are deformed by the cylinders with different rotation velocities, placement of the plates in a package (a sandwich) has a direct influence on distribution of interlayer deformations. According to the opinion of the authors of the method [1], in order to achieve strongest cohesion, the most favorable placement of the thinnest plate is in front of the cylinder with higher rotation velocity.

However, if only placement of the plates with different thicknesses in respect to cylinders with different rotation velocities is taken into consideration, the cohesion strength and output linearity of the welded package in such an approach is rather limited.

The main idea behind the invention was to develop such a solid-phase welding method, which, if compared with prototype method, would provide manufacturing of products with higher cohesion of the plates and more linear output of the welded package.

This objective can be achieved by the method, which, in the same way as the prototype method, consists of sandwiching plates in a package, heating the package, placing it between cylinders of different diameter and deformation. Special damping lining is inserted between the plates, the package is placed between cylinders in such a way, that the plate with the smallest yield value under welding temperature shall face cylinder with smaller diameter. Heating and deformation of the package shall be carried out in the vacuum. Heating is carried out in two stages, at first temperature reaches 0.4-0.5 of melting temperature of a plate with the smallest yield value, then—HF (high frequency) heating is applied, where the high frequency shall heat the damping lining up to 0.92-0.95 of its melting temperature. Angular velocities of the rotating cylinders and their radiuses shall be chosen on the basis of following conditions: $\sigma_{s1}(T) \times \epsilon_1 \times H_1 / \sigma_{s2}(T) \times \epsilon_2 \times H_2 = \omega_2 \times R_2 / \omega_1 \times R_1$ (1), where $\sigma_{s1}(T)$ and $\sigma_{s2}(T)$—yield value of each plate under welding temperature; $\epsilon_1$ and $\epsilon_2$—relative pressure on each plate; $H_1$ and $H_2$—initial thickness of each plate; $\omega_1$ and $\omega_2$—angular velocity of each cylinder; $R_1$, and $R_2$—radius of each cylinder. To achieve better results metal plate facing smaller diameter cylinder shall be the thickest one. Copper was chosen as the most appropriate material for damping lining. Additional metal barrier liner can be inserted between damping lining and the plate with the smallest yield value, the barrier liner can be made of following materials: niobium, tantalum and nickel.

The placement of the sandwiched metal plates between cylinders is conducted in such a way, that the plate with the smallest yield value under welding temperature faces smaller diameter cylinder has direct influence on the intensity of interlayer deformations and intensifies adhesive processes, which in its turn significantly increases cohesive forces between the layers.

Heating of the package and its following deformation in vacuum excludes the possibility of oxide film formation on the surface of the plates, thus additionally improving cohesive forces between the layers.

Heating of the package in two stages under conditions, mentioned above, on one side discontinues phase transformations in the plate material with the smallest yield value under welding temperature, on the other side, allows to provide heating of the damping layer to a temperature when it starts sliding in relation to plates thus cleaning them from oxide films. Both of these factors provide improvement of cohesive forces between the plates.

Adherence to specification (1) provides even volumes, which are displaced in the process of rolling welded plates per unit of time, thus contributing to raising cohesive forces between the plates, and production linear packages with no corrugation.

Copper, chosen as the material for damping layer contributes to efficient accumulation within itself of an oxide layer, thus contributing to improvement of cohesive forces between the plates.

Placement of barrier metal liner, from niobium, tantalum or nickel between damping layer and the plate with lesser yield value prevents formation of fragile phases in the binding zone, thus improving cohesion between plates from different metals.

The device of the invention consists of the closed mill 1 (vacuum mill) (FIG. 1), cylinders of different diameter 2 and 3 are located in the middle of the mill. Mill 1 is connected to vacuum furnace, consisting of furnace 4 electric resistance and HF (high frequency) furnace 5. Vacuum furnace is connected via locking device 6 to a vacuum loading camera 7. Mill 1 is connected via locking device 8 to a vacuum unloading camera 9. Each of two cylinders 2 and 3 is equipped by an individual electromechanical drive 10. Mill 1 and vacuum furnace are connected to high-vacuum pumps 11, and cameras 7 and 9 are connected to high-pressure vacuum pumps 12.

Figure 2:
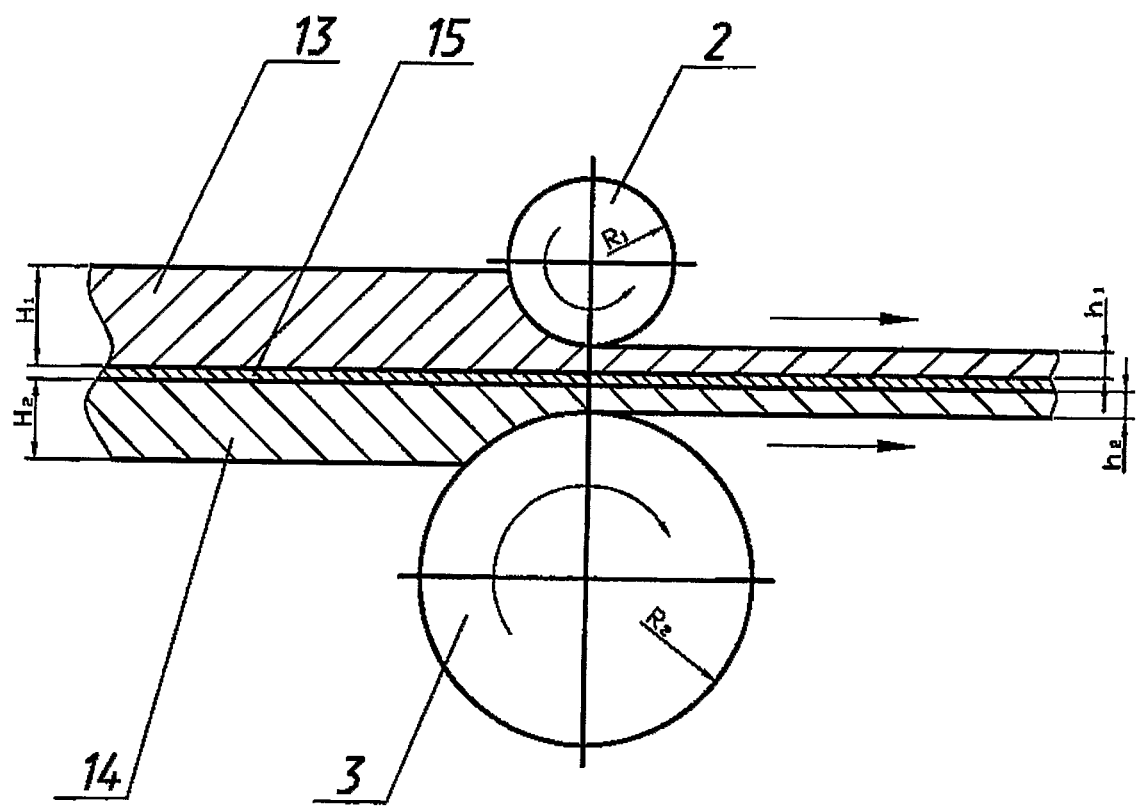
FIG. 2 provides a schematic view of package's deformation point.

The method shall be applied as follows. Welded plates 13 and 14, each has a different thickness (FIG. 2), for example, respectively made of titanium and stainless steel, and damping layer 15, for example, made of copper, all undergo mechanical and liquid chemical treatment. Then plates are sandwiched in a package 16 (FIG. 1) and are loaded into camera 7 so that the titanium plate 13 (with lesser yield value) at the moment of rolling by cylinders 2 and 3 should face cylinder 2, which has smaller diameter. Then, mill 1, vacuum furnace and cameras 7 and 9 shall be hermetically sealed and the air shall be pumped out by pumps 11 and 12 (locking devices 6 and 8 are locked). When the camera 7 is pressurized to the value $10^{-1}$ Pascal, locking device 6 is opened and package 16 is to be moved to vacuum furnace by special manipulator (manipulator is not shown on the drawing), electrical resistance is fixed in the furnace. Locking device 6 is locked. Package 16 shall be heated in the furnace under pressure $10^{-2}$ Pascal up to the 882° C. (0.5 of the temperature required to melt titanium). Then package 16 passes through furnace 5, where copper lining is heated up to 1018° C. (0.94 of its melting temperature) then package is placed between cylinders 2 and 3 and deformed, while cylinders' rotational velocities shall be fixed on the basis of the condition (1). In case if $\sigma_{s1}(882°\ C.)=4$ kG/mm$^2$ and $\sigma_{s2}(882°\ C.)=10$ kG/mm$^2$; $\epsilon_1=36\%$ and $\epsilon_2=23.8\%$; $H_1=33$ mm and $H_2=22$ mm; $R_1=36.5$ mm and $R_2$ 43.75 mm; value of angular velocities shall be as follows: $\omega_1=0.41$ sec$^{-1}$ and $\omega_2=0.31$ sec$^{-1}$.

As it was discovered in the course of investigation, the method of the invention leads to 50% improvement of the cohesive forces between layers at the expense of increased level of interlayer deformations of bonded metals and to achieve more linear package output (i.e. without corrugation).

While the invention has been described in detail and with reference to specific examples thereof, it will be apparent to one skilled in the art that various changes and modifications can be made therein without departing from the spirit and scope thereof.

What is claimed is:

1. In a method of welding of metal plates in a solid phase, wherein the metal plates are combined to form a package, and welded together by heating and deforming the package by contacting the package with two rotating cylinders of different circumference, wherein a first cylinder has a radius $R_1$ and a second cylinders has a radius $R_2$, the improvement comprising:

providing a damping lining between the metal plates;

placing the package between the first cylinder and the second cylinder such that the metal plate with the smallest yield value under welding temperature faces the cylinder with smaller diameter, heating and deforming the package in vacuum, and in two stages such that during the first stage the temperature reaches about 0.4 to about 0.5 of melting temperature of the metal plate with the smallest yield value, during the second stage the package is heated by a high frequency which heats the damping lining material up to about 0.92 to about 0.95 of its melting temperature, wherein angular velocities of the rotating cylinders and their radiuses are selected on the basis of the following formula:

$$\sigma_{s1}(T) \times \epsilon_1 \times H_1 / \sigma_{s2}(T) \times \epsilon_2 \times H_2 = \omega_2 \times R_2 / \omega_1 \times R_1,$$

wherein $\sigma_{s1}(T)$ and $\sigma_{s2}(T)$ are yield value of each metal plate under welding temperature;

$\epsilon_1$ and $\epsilon_2$—relative pressure on each plate;

$H_1$ and $H_2$—initial thickness of each plate; and $\omega_1$ and $\omega_2$—angular velocity of each cylinder.

2. The method of claim 1, wherein the metal plate which faces the cylinder with a smaller diameter is ticker than the metal plate which faces the cylinder with a larger diameter.

3. The method of claim 1, wherein the damping lining comprises copper.

4. The method of claim 1, wherein the damping lining consists essentially of copper.

5. The method of claim 2, wherein the damping lining comprises copper.

6. The method of claim 2, wherein the damping lining consists essentially of copper.

7. The method of claim 3, further comprising providing an additional metal barrier liner, wherein the additional metal barrier liner is disposed between the damping lining and the plate having the smallest yield value.

8. The method of claim 7, wherein the additional metal barrier liner is made from at least one of niobium, tantalum and nickel.

* * * * *